G. C. BATTEN.
RIDDLE.
APPLICATION FILED JAN. 5, 1918.
1,306,325. Patented June 10, 1919.
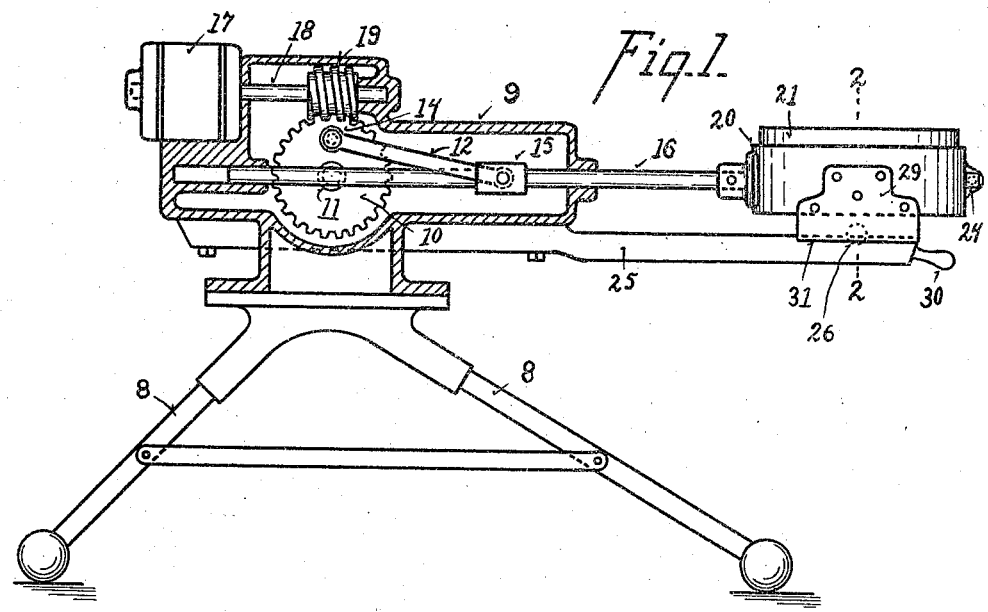
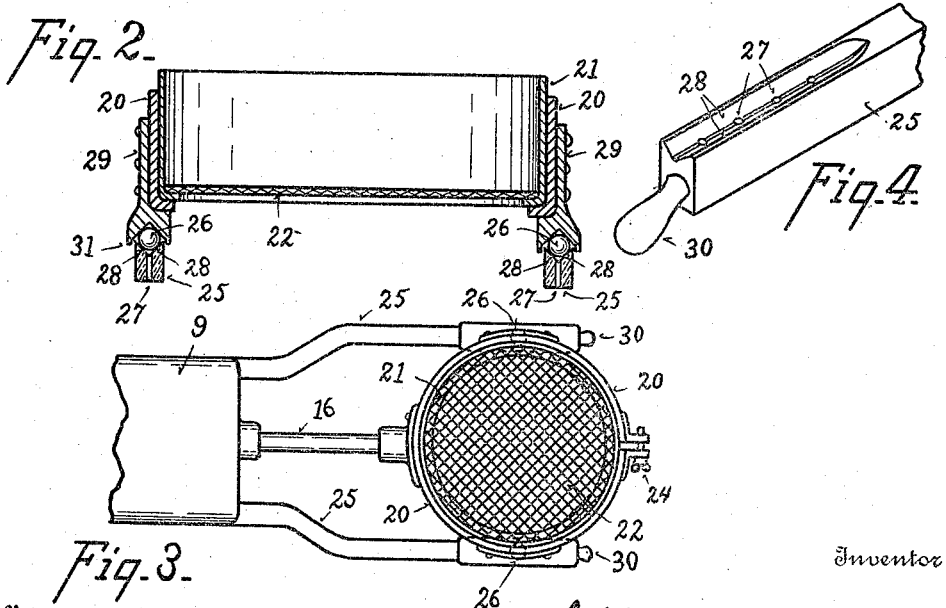
Witness
A. Kesson
W. Thornton Bogert
Inventor
Gideon C. Batten,
By C. W. Miles,
Attorney

UNITED STATES PATENT OFFICE.

GIDEON C. BATTEN, OF CINCINNATI, OHIO.

RIDDLE.

1,306,325. Specification of Letters Patent. Patented June 10, 1919.

Application filed January 5, 1918. Serial No. 210,541.

*To all whom it may concern:*

Be it known that I, GIDEON C. BATTEN, a citizen of the United States, residing at Cincinnati, in the county of Hamilton and State of Ohio, have invented certain new and useful Improvements in Riddles, of which the following is a specification.

My invention relates to improvements in riddles for foundry and similar purposes. One of its objects is to provide a reciprocating riddle with improved supporting means. Another object is to provide supporting means to support the riddle at the point of strain, and to guide the riddle backward and forward in a single plane. Another object is to provide a support opposing a minimum of resistance to the movement of the riddle and protected from and not liable to be interfered with in operation due to sand or grit coming in contact with the bearing surfaces. My invention also comprises certain details of form, combination and arrangement, all of which will be fully set forth in the description of the accompanying drawings, in which:

Figure 1 is a side elevation, partly in section of a molder's riddle embodying my improvements.

Fig. 2 is a sectional detail on line 2 2 of Fig. 1.

Fig. 3 is a top plan view of a portion of the riddle of Fig. 1.

Fig. 4 is a detail perspective of one of the riddle supporting arms.

The accompanying drawings represent the preferred embodiment of my invention in which 8 represent the supporting legs, usually a tripod, upon which is supported a housing 9. Within the housing is a crank wheel 10 mounted upon a stud shaft 11 rigidly attached to the housing 9. A pitman 12 is pivotally attached at one end to a crank pin 14 carried by the crank wheel. The opposite end of the pitman is pivotally attached to a cross-head 15 rigidly attached to a shaker rod 16 which slides endwise in bearings at opposite ends of the housing. The crank wheel 10 may be driven at the desired speed from a pneumatic or other motor. As illustrated, 17 represents an inclosed type of electric motor attached rigidly to a bracket forming part of the housing, and with its shaft 18 at one end projecting through into the interior of the casing where it is provided with a worm 19, which meshes with worm wheel teeth cut on the periphery of the crank wheel 10.

The main frame 20 of the riddle is attached rigidly to one end of the shaker rod 16, and comprises a heavy flanged metal ring or hoop split at one point with its meeting edges adapted to be drawn together by means of one or more clamping bolts 24. A series of lighter sheet metal hoops 21 having their bottoms closed with stamped or woven-wire screens 22 of different mesh are provided and adapted to be interchangeably inserted into and removed from the frame 20, and clamped in place therein by means of the clamping bolts 24.

In order to support the riddle and its weight of material to be screened, and to provide for its movement freely in unison with the movements of and in line with the shaker rod, two supporting arms 25 are attached rigidly to the housing and project out beneath the riddle where they are provided with V-shaped grooves or track faces 28 in their upper surfaces to provide ways or tracks for steel balls 26, preferably one at each side of the riddle to ride upon. A series of perforations 27 are also preferably provided through which any sand or foreign matter may escape downwardly from the grooves 28.

Rigidly attached to the frame 20 at opposite sides thereof are shoes or brackets 29 provided on their under sides with V-shaped grooves or channels to form track faces to rest upon the upper faces of the balls and relative to which the balls may roll. The brackets 29 are also provided at the sides and ends with downwardly directed flanges 31 designed to prevent the accidental introduction of sand or foreign matter upon the tracks along which the balls roll as the riddle reciprocates. The supporting arms 25 at their free ends are provided with handles 30 which form convenient means to lift one end of the riddle to move it from place to place, where otherwise the riddle is an awkward object to grasp and move about. If desired rollers may be substituted for the balls illustrated.

Means is thus provided to firmly support the riddle so as to move strictly in right lines with the shaker rod, and avoid strain laterally upon the bearings of said rod, and at the same time provides for a practically frictionless movable support therefor and one which does not require a lubricant and is thus not materially affected by sand or grit.

The mechanism herein illustrated and described is capable of considerable modification without departing from the principle of my invention.

Having described my invention, what I claim is:

1. A portable riddle comprising, means to reciprocate a container, a portable housing to inclose and protect said reciprocating means, a container for the material to be screened located externally of and in sliding engagement with said housing, supporting arms projecting from opposite sides of said housing to positions at the sides of said container, brackets carried by said container opposite said supporting arms, and roller members introduced between said brackets and supporting arms.

2. A portable riddle comprising, means to reciprocate a container, a portable housing to inclose and protect said reciprocating means, a container for the material to be screened located externally of and having sliding engagement with said housing, supporting arms projecting from said housing to positions at the sides of said container and serving as supports for said container and also as handles by means of which said riddle may be transported from place to place, and brackets carried by said container opposite said supporting arms to support said container relative to said arms in reciprocal relation.

3. A riddle comprising, means to reciprocally drive a container, a portably mounted casing to inclose said driving means, a container for the material to be screened located externally of and having sliding engagement with said casing, supporting arms projecting from said casing to positions at the sides of said container, brackets carried by said container opposite said supporting arms, adjacent faces of said arms and brackets constituting grooved tracks, and roller members interposed between the track faces of said brackets and supporting arms.

4. A riddle comprising, means to reciprocally drive a container, a portably mounted casing to inclose said driving means, a container for the material to be screened located externally of and having sliding engagement with said casing, supporting arms projecting from said casing to positions at the sides of said container, brackets carried by said container opposite said supporting arms, adjacent faces of said arms and brackets constituting grooved tracks, and spherical roller members interposed between the track faces of said brackets and supporting arms.

In testimony whereof I have affixed my signature in the presence of two witnesses.

GIDEON C. BATTEN.

Witnesses:
C. W. MILES,
W. THORNTON BOGERT.